(12) United States Patent
Hardwick et al.

(10) Patent No.: US 10,774,513 B2
(45) Date of Patent: *Sep. 15, 2020

(54) AIRCRAFT VACUUM TOILET SYSTEM SPLASHGUARD

(71) Applicant: B/E Aerospace, Inc., Winston-Salem, NC (US)

(72) Inventors: Christopher Hardwick, Roscoe, IL (US); Thao Hoang, Rockford, IL (US); Bradley J. Buniak, Schaumburg, IL (US); Christian C. Kurshinsky, Rockford, IL (US)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/422,360

(22) Filed: May 24, 2019

(65) Prior Publication Data

US 2019/0345705 A1    Nov. 14, 2019

Related U.S. Application Data

(63) Continuation of application No. 15/084,185, filed on Mar. 29, 2016, now Pat. No. 10,301,805.

(Continued)

(51) Int. Cl.
*E03D 9/00*    (2006.01)
*E03D 11/16*   (2006.01)
(Continued)

(52) U.S. Cl.
CPC ............... *E03D 9/00* (2013.01); *B64D 11/02* (2013.01); *E03D 5/012* (2013.01); *E03D 5/02* (2013.01);
(Continued)

(58) Field of Classification Search
CPC .. E03D 9/00; E03D 5/024; E03D 1/00; A47K 13/24; E03F 1/006; B64D 11/02; E03C 1/181
(Continued)

(56) References Cited

U.S. PATENT DOCUMENTS 344,777 A     6/1886  Griswold
2,680,714 A   6/1954  Carlsson et al.
(Continued)

FOREIGN PATENT DOCUMENTS

CH    567956 A5     10/1975
CN    201067373 Y    6/2008
(Continued)

OTHER PUBLICATIONS

Extended European Search Report in European Patent Application No. 16774058.8 dated Nov. 14, 2018. 11 pages.
(Continued)

*Primary Examiner* — David P Angwin
*Assistant Examiner* — Nicholas A Ros
(74) *Attorney, Agent, or Firm* — Locke Lord LLP; Scott D. Wofsy; Joshua L. Jones

(57) ABSTRACT

A toilet bowl system for use on-board an aircraft includes a toilet bowl body comprising a toilet bowl and a shroud. The toilet bowl has a rim. A removable splash guard is positioned between the toilet bowl and the shroud, and comprises a generally flat, flexible, planar shield having a central opening. The shield includes a top portion and a rear portion, the top portion faces the shroud and the lower portion faces the toilet bowl, and the lower portion is shaped to correspond with an upper portion of the rim of the toilet bowl and is configured to secure the removable toilet splash guard to the toilet bowl.

20 Claims, 4 Drawing Sheets

Related U.S. Application Data

(60) Provisional application No. 62/140,260, filed on Mar. 30, 2015.

(51) Int. Cl.

| | | |
|---|---|---|
| *E03F 1/00* | (2006.01) | |
| *E03D 5/012* | (2006.01) | |
| *E03D 5/10* | (2006.01) | |
| *E03D 11/13* | (2006.01) | |
| *F16K 3/04* | (2006.01) | |
| *F16K 31/04* | (2006.01) | |
| *F16K 31/46* | (2006.01) | |
| *B64D 11/02* | (2006.01) | |
| *E03D 5/02* | (2006.01) | |

(52) U.S. Cl.
CPC ............ *E03D 5/10* (2013.01); *E03D 11/13* (2013.01); *E03D 11/135* (2013.01); *E03D 11/16* (2013.01); *E03F 1/006* (2013.01); *F16K 3/04* (2013.01); *F16K 31/047* (2013.01); *F16K 31/465* (2013.01)

(58) Field of Classification Search
USPC ... 4/245.3–245.5, 300.3, 431–433, 657–658, 4/902; D23/308, 310
See application file for complete search history.

(56) References Cited

U.S. PATENT DOCUMENTS

| | | |
|---|---|---|
| 2,708,033 A | 5/1955 | Thomas |
| 2,878,829 A | 3/1959 | Folmsbee |
| 3,411,162 A | 11/1968 | Palmer |
| 3,510,099 A | 5/1970 | Crump |
| 3,616,617 A | 11/1971 | Groote |
| 3,719,957 A | 3/1973 | Riedel |
| 3,722,850 A | 3/1973 | Kemper |
| 3,835,479 A | 9/1974 | Milette et al. |
| 3,860,973 A | 1/1975 | Uyeda et al. |
| 3,902,876 A | 9/1975 | Moen et al. |
| 3,939,500 A | 2/1976 | Miller et al. |
| 3,995,328 A | 12/1976 | Carolan et al. |
| 4,041,554 A | 8/1977 | Gregory et al. |
| 4,237,934 A | 12/1980 | Gregory et al. |
| 4,289,611 A | 9/1981 | Brockmann |
| 4,376,314 A | 3/1983 | Iwans |
| 4,438,781 A | 3/1984 | Brenholt |
| 4,469,497 A | 9/1984 | Linhardt |
| 4,511,117 A | 4/1985 | Soderstrom |
| 4,546,502 A | 10/1985 | Lew |
| 4,601,210 A | 7/1986 | Brown |
| 4,612,120 A | 9/1986 | Box |
| 4,635,901 A | 1/1987 | Pond |
| 4,713,847 A | 12/1987 | Oldfelt et al. |
| 4,783,859 A | 11/1988 | Rozenblatt et al. |
| 4,811,754 A | 3/1989 | Wilhelm |
| 4,968,325 A | 11/1990 | Black et al. |
| 5,007,117 A | 4/1991 | Oldfelt et al. |
| 5,035,011 A | 7/1991 | Rozenblatt |
| 5,048,130 A | 9/1991 | Brotman et al. |
| 5,065,786 A | 11/1991 | Rozenblatt |
| 5,099,867 A | 3/1992 | Emery |
| 5,142,712 A | 9/1992 | Hennessy |
| 5,187,818 A | 2/1993 | Barrett et al. |
| 5,231,706 A | 8/1993 | Kendall |
| 5,271,105 A | 12/1993 | Tyler |
| 5,317,763 A | 6/1994 | Frank et al. |
| 5,326,069 A | 7/1994 | Clear et al. |
| 5,344,085 A | 9/1994 | Hofseth |
| 5,372,710 A | 12/1994 | Frank |
| 5,464,191 A | 11/1995 | Shenk |
| 5,515,554 A | 5/1996 | Clear et al. |
| 5,535,770 A | 7/1996 | Nurmi |
| 5,604,938 A | 2/1997 | Tyler |
| 5,625,905 A | 5/1997 | Woods |
| 5,707,027 A | 1/1998 | Hiesener |
| 5,754,987 A | 5/1998 | Johansson et al. |
| 5,813,061 A | 9/1998 | Tornqist |
| 5,873,135 A | 2/1999 | Tornqvist |
| 5,909,968 A | 6/1999 | Olin et al. |
| 5,956,780 A | 9/1999 | Tyler |
| 6,085,366 A | 7/2000 | Pondelick et al. |
| 6,131,596 A | 10/2000 | Monson |
| 6,148,860 A | 11/2000 | Sigler |
| 6,152,160 A | 11/2000 | Bowden Wilcox et al. |
| 6,186,162 B1 | 2/2001 | Purvis et al. |
| 6,202,683 B1 | 3/2001 | Smith |
| 6,212,700 B1 | 4/2001 | Giesler et al. |
| 6,223,357 B1 | 5/2001 | Claas |
| 6,226,807 B1 | 5/2001 | Rozenblatt et al. |
| 6,240,575 B1 | 6/2001 | Polo Sanchez |
| 6,325,356 B1 | 12/2001 | Rozenblatt |
| 6,347,416 B1 | 2/2002 | Anderson et al. |
| 6,349,424 B1 | 2/2002 | Stradinger et al. |
| 6,349,425 B1 | 2/2002 | Stradinger et al. |
| 6,353,942 B1 | 3/2002 | Pondelick et al. |
| 6,370,709 B1 | 4/2002 | Stradinger et al. |
| 6,394,122 B1 | 5/2002 | Sibley et al. |
| 6,402,799 B1 | 6/2002 | Kokubo et al. |
| 6,453,481 B1 | 9/2002 | Pondelick et al. |
| 6,484,743 B2 | 11/2002 | Bauckman |
| 6,502,278 B2 | 1/2003 | Oh et al. |
| 6,513,174 B1 | 2/2003 | Johansson |
| 6,536,054 B2 | 3/2003 | Anderson et al. |
| 6,536,055 B2 | 3/2003 | Pondelick et al. |
| 6,546,593 B2 | 4/2003 | Oh et al. |
| 6,575,425 B1 | 6/2003 | Betz |
| 6,648,002 B2 | 11/2003 | Lappalainen |
| 6,704,947 B2 | 3/2004 | Stradinger et al. |
| 6,729,368 B2 | 5/2004 | Nguyen |
| 6,732,386 B2 | 5/2004 | Anderson et al. |
| 6,748,973 B2 | 6/2004 | Lindroos |
| 6,763,531 B1 | 7/2004 | Huffman et al. |
| 6,883,188 B2 | 4/2005 | Sigler et al. |
| 6,932,297 B1 | 8/2005 | Steindl et al. |
| 6,977,005 B2 | 12/2005 | Erdmann et al. |
| 6,981,285 B2 | 1/2006 | Sigler et al. |
| 7,118,677 B2 | 10/2006 | Hoffjann et al. |
| 7,127,749 B2 | 10/2006 | Ling |
| 7,156,363 B2 | 1/2007 | Parsons et al. |
| 7,169,305 B2 | 1/2007 | Gomez |
| 7,188,822 B2 | 3/2007 | Marcichow |
| 7,331,365 B2 | 2/2008 | Nguyen |
| 7,690,053 B2 | 4/2010 | Pondelick |
| 7,921,478 B1 | 4/2011 | Vanini |
| 8,266,731 B2 | 9/2012 | Marra |
| 8,607,370 B2 | 12/2013 | Hoang et al. |
| 8,613,115 B2 | 12/2013 | Seibt et al. |
| 8,769,731 B2 | 7/2014 | Seibt |
| 8,887,320 B2 | 11/2014 | Dezarn et al. |
| 9,371,136 B2 | 6/2016 | Beach et al. |
| 10,301,805 B2 * | 5/2019 | Hardwick ............... E03D 9/00 |
| 2001/0034902 A1 | 11/2001 | Tyler |
| 2002/0069459 A1 | 6/2002 | Pondelick et al. |
| 2002/0145080 A1 | 10/2002 | Renken et al. |
| 2005/0173336 A1 | 8/2005 | Arnaud |
| 2006/0075546 A1 | 4/2006 | Sigler |
| 2006/0096015 A1 | 5/2006 | Lim |
| 2007/0079432 A1 | 4/2007 | Shoikhet et al. |
| 2007/0204391 A1 | 9/2007 | Marra |
| 2007/0226887 A1 | 10/2007 | Lappalainen et al. |
| 2007/0297894 A1 | 12/2007 | Dandasi et al. |
| 2008/0185477 A1 | 8/2008 | Seibt |
| 2010/0083433 A1 | 4/2010 | Pondelick et al. |
| 2010/0083435 A1 | 4/2010 | Hoang et al. |
| 2011/0107506 A1 | 5/2011 | Nasrallah |
| 2011/0173743 A1 | 7/2011 | Jensen et al. |
| 2012/0066824 A1 | 3/2012 | Dezarn et al. |
| 2014/0041109 A1 | 2/2014 | Stauber et al. |
| 2014/0101837 A1 | 4/2014 | Boodaghians et al. |
| 2014/0137319 A1 | 5/2014 | Beach et al. |
| 2014/0208498 A1 | 7/2014 | Beach et al. |
| 2014/0223655 A1 | 8/2014 | Dillard |

(56) References Cited

U.S. PATENT DOCUMENTS

2014/0259343 A1 9/2014 Wilson et al.
2015/0013058 A1 1/2015 Bucher et al.
2019/0307300 A1* 10/2019 Smith ................... E03D 9/00

FOREIGN PATENT DOCUMENTS

| CN | 102171401 A | 8/2011 |
|---|---|---|
| CN | 203462543 U | 3/2014 |
| CN | 204037764 U | 12/2014 |
| CN | 104334452 A | 2/2015 |
| EP | 1 818 462 | 8/2007 |
| EP | 2 050 882 | 9/2015 |
| JP | 4835303 B2 | 12/2011 |
| JP | 2012-122195 | 6/2012 |
| WO | WO-02/06594 A1 | 1/2002 |
| WO | WO-2008/015070 | 1/2008 |
| WO | WO-2008/042728 A1 | 4/2008 |
| WO | WO-2012/146632 a1 | 11/2012 |
| WO | WO-2014/081912 A2 | 5/2014 |
| WO | WO-2014/120878 A1 | 8/2014 |

OTHER PUBLICATIONS

Extended European Search Report on EP Application No. 16774095 dated Mar. 14, 2019. 3 pages.
International Search Report and Written Opinion for PCT/US2016/024963, dated Aug. 16, 2016. 4 pages.
International Search Report and Written Opinion for PCT/US2016/024888, dated Aug. 2016, 10 pages.
International Search Report and Written Opinion for PCT/US2016/024909, dated Jun. 10, 2016, 7 pages.
International Search Report and Written Opinion for PCT/US2016/024936, dated Jun. 16, 2016, 6 pages.
International Search Report and Written Opinion for PCT/US2016/024983, dated Jun. 17, 2016, 9 pages.
Jaromir Jezny et al: "Position Measurement with Hall Effect Sensors", American Journal of Mechanical Engineering (Nov. 1, 2013) pp. 231-235.
Office Action on EP Application No. 16774085.1 dated Nov. 19, 2018. 9 pages.
Office Action on European Patent Application No. 16774064.6 dated Nov. 15, 2018. 8 pages.
Office Action on European Patent Application No. 16774075.2 dated Nov. 15, 2018. 7 pages.
First Office Action issued on CN 2016800276841 dated Nov. 7, 2019.
First Office Action issued on CN 2016800298766 dated Nov. 4, 2019.
First Office Action issued on CN 2016800300855 dated Nov. 18, 2019.
First Office Action issued on CN 2016800301699 dated Mar. 24, 2020.
Second Office Action issued on CN 2016800276841 dated Apr. 13, 2020.

* cited by examiner

AIRCRAFT VACUUM TOILET SYSTEM SPLASHGUARD

CROSS-REFERENCES TO RELATED APPLICATIONS

The present application is a continuation of U.S. application Ser. No. 15/084,185, filed Mar. 29, 2016, which claims the benefit of U.S. Provisional Application No. 62/140,260, filed Mar. 30, 2015, both of which are incorporated herein by reference in their entireties.

FIELD OF THE DISCLOSURE

The present disclosure relates generally to vacuum toilet systems and, more generally, to a splashguard for such systems.

BACKGROUND

Designing a toilet for an aircraft poses challenges that do not generally occur in ground-based toilet designs. For instance, in an aircraft, space and weight are at a premium, and using regular water-flush toilets is not practical. There are additional drawbacks associated with existing systems. For instance, existing systems allow waste material to splash up under the shroud and over the toilet bowl, and producing an odor and potentially corrosion related damage. Also, performing routine maintenance and cleaning is much more difficult, since space restrictions make access to plumbing nearly impossible.

DRAWINGS

While the appended claims set forth the features of the present techniques with particularity, these techniques may be best understood from the following detailed description taken in conjunction with the accompanying drawings of which:

DETAILED DESCRIPTION

Figure 1:
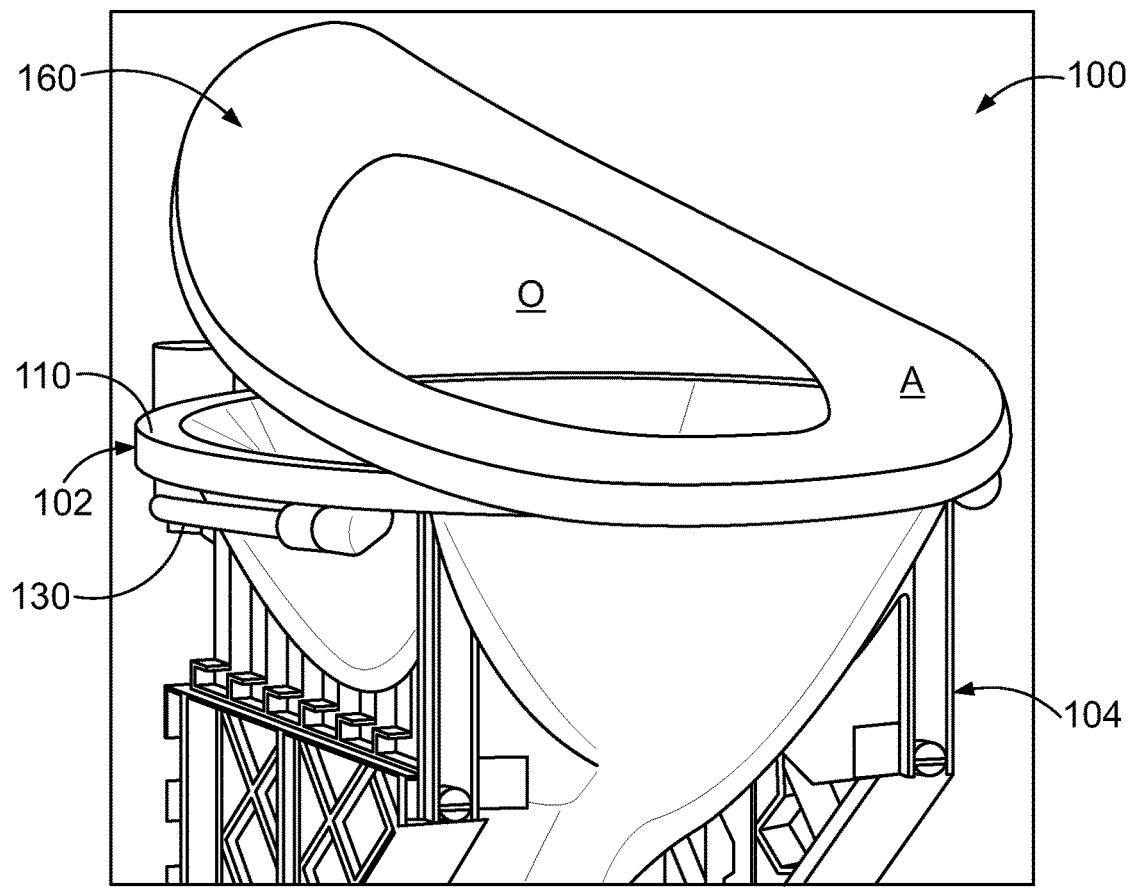
FIG. 1 is a perspective view of a toilet system configured according to an embodiment.

The following discussion is directed to various exemplary embodiments. However, one possessing ordinary skill in the art will understand that the examples disclosed herein have broad application, and that the discussion of any embodiment is meant only be exemplary of that embodiment, and not intended to suggest that the scope of the disclosure, including claims, is limited to that embodiment.

Certain terms are used throughout the following description to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

The disclosure is generally directed to a toilet bowl system for use on-board an aircraft. A toilet bowl body comprises a toilet shroud and a toilet bowl having a rim portion. A removable splash guard is positioned between the toilet bowl and the shroud and comprises a generally flat, flexible, planar shield having a central opening. The shield includes a top portion and a rear portion, where the top portion faces the shroud and the lower portion faces the toilet bowl. The lower portion is shaped to correspond with an upper portion of the rim of the toilet bowl and is configured to secure the removable toilet splash guard to the toilet bowl. In addition, the lower portion of the planar shield has the added benefit of sealing against the toilet bowl and thereby preventing waste migration from inside the toilet bowl to the outside.

Turning to FIG. 1, a toilet system configured according to an embodiment is shown. The toilet, generally labelled 100, is configured to be deployed on an aircraft, and may be housed within an external housing (not shown). The toilet 100 includes a bowl 102 attached to a frame 104. The bowl 102 includes a rim 110. The toilet 100 also includes a fluid control valve 130 provided in the vicinity of the rim 110.

The toilet 100 further includes a removable splash guard 160 positioned between the toilet bowl 102 and the shroud 410 (shown in FIG. 4). The splash guard 160 is a generally flat, flexible, planar shield having a central opening O, a top portion A, and a bottom portion B (illustrated in FIG. 2A). Next, the structure of the splash guard 160 will be described in more detail with references to FIGS. 2A, 2B and 3.

Figure 2A:
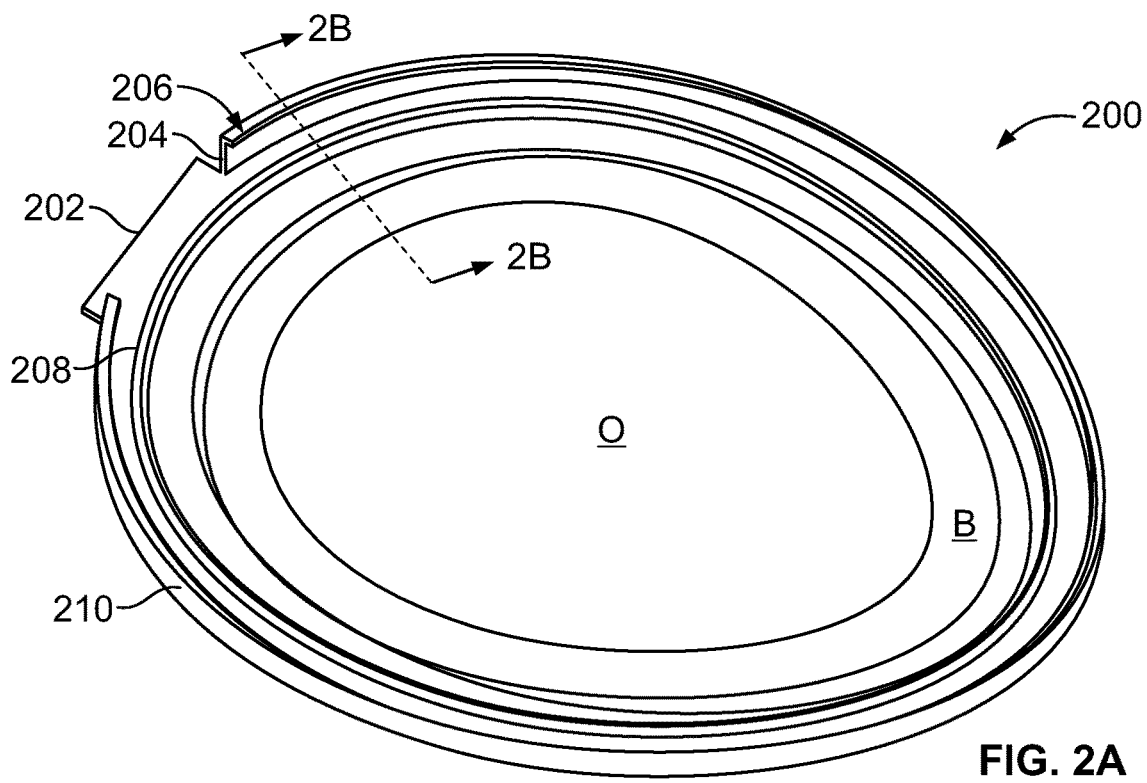
FIG. 2A is a bottom view of a toilet splashguard according to an embodiment.
Figure 3:
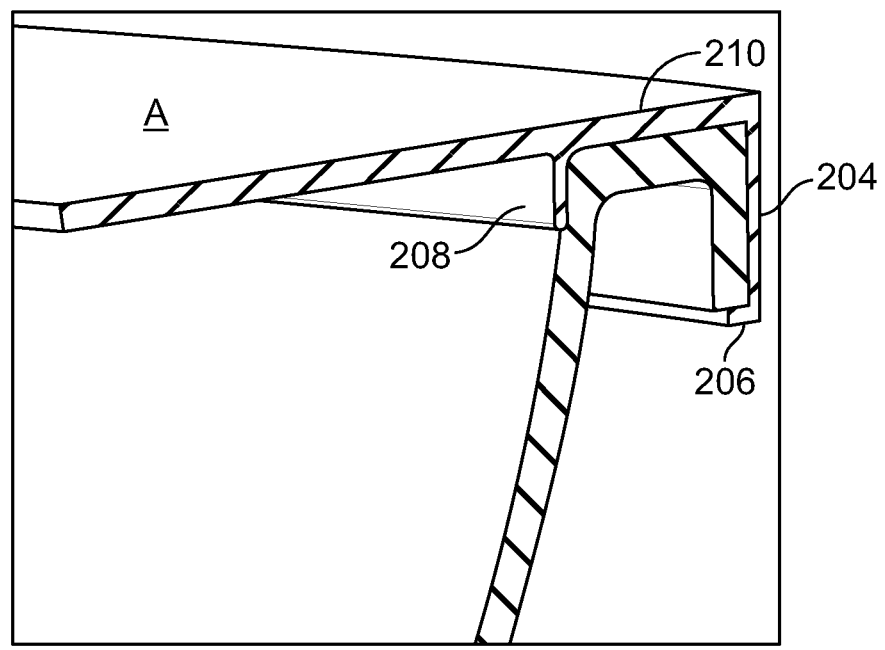
FIG. 3 is an enlarged view illustrating an interaction between the toilet splashguard and a rim of the toilet bowl, according to an embodiment.

Referring now to FIG. 2A, a splash guard 160 configured according to an embodiment of the toilet system 200 is shown. The lower portion B of the splash guard 160 includes a first ridge 204 extending along an outside circumferential edge 210 of the shield and extending substantially perpendicular to the planar shield. As can be seen more clearly in FIG. 3, the first ridge 204 extends downward in a substantially perpendicular direction relative to the outside circumferential edge 210.

Turning back to FIGS. 2A and 2B, the lower portion B of the splash guard 160 includes a second ridge 208 extending concentric to the first ridge 204 and also extending substantially perpendicular to the planar shield. As can be seen more clearly in FIG. 3, the second ridge 208 also extends downward in a substantially perpendicular direction relative to the outside circumferential edge 210. According to an embodiment, the first ridge 204 and the second ridge 208 are axially spaced apart from each other. As shown in FIG. 3, the rim 110 of the toilet bowl 102 is configured to fit in the axial space between the first ridge 204 and the second ridge 208 according to one embodiment. According to some embodiments, the lower portion B along with the second ridge 208 helps seal the toilet splash guard 160 against the toilet bowl 102 in order to prevent waste from migrating outside the toilet bowl 102.

Figure 2B:
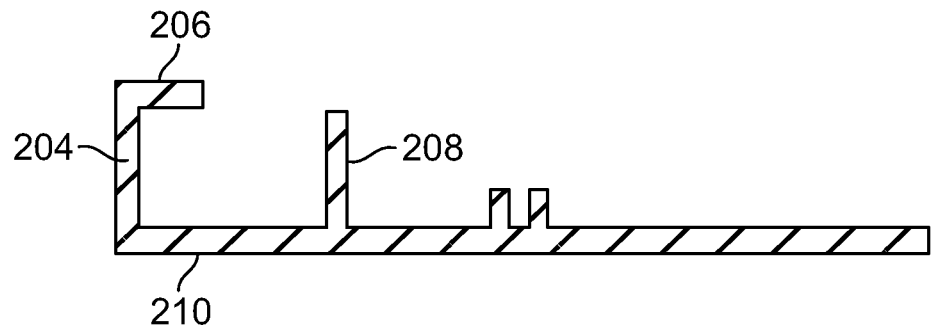
FIG. 2B is a partial cross-section view of the toilet splashguard taken across section line 2B, according to an embodiment.
Figure 5:
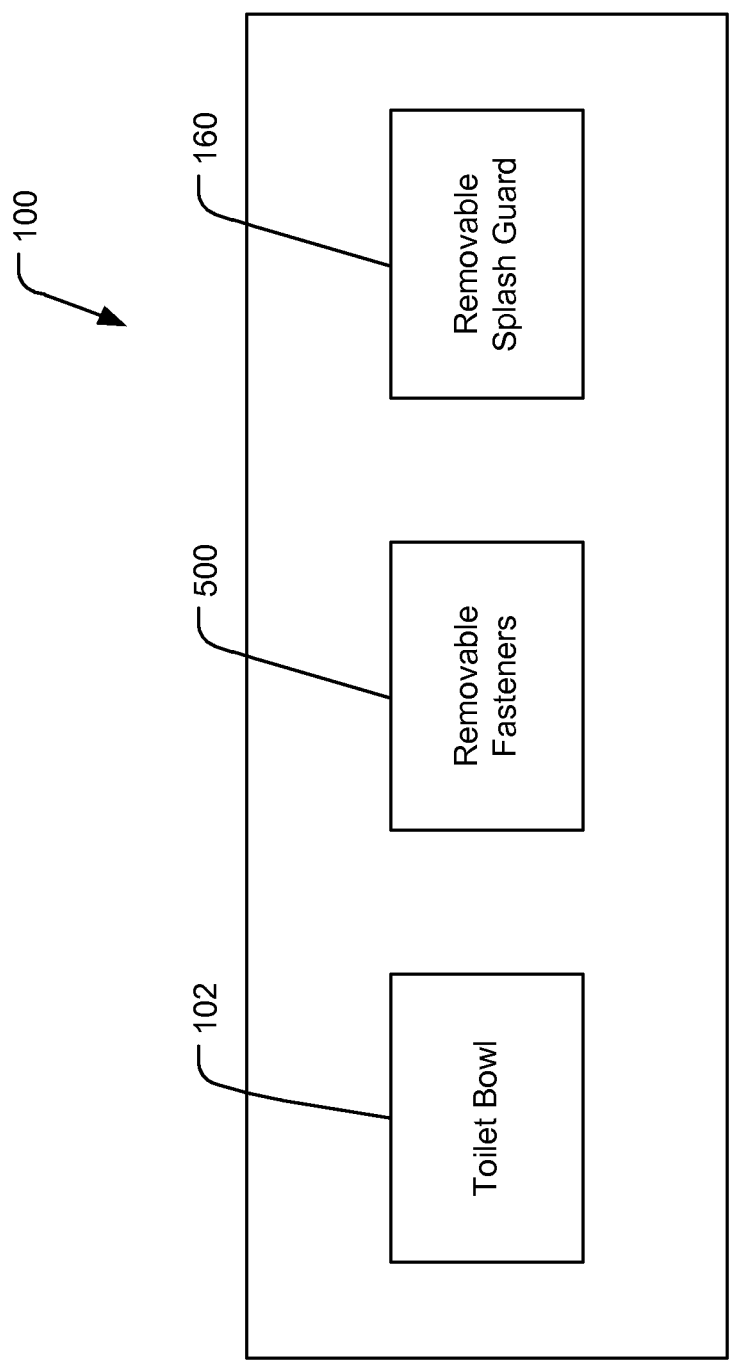
FIG. 5 illustrates a toilet system including removable fasteners according to an embodiment.

As shown in FIGS. 2A and 2B, the first ridge 204 includes a lip 206 that extends substantially perpendicularly from a free end of the first ridge 204. As can be seen more clearly in FIG. 3, the lip 206 extends towards the central opening O of the planar shield. According to one embodiment illustrated in FIG. 3, the lip 206 of the first ridge 204 is configured to overlap a portion of the rim 110 of toilet bowl 102 to secure the removable toilet splash guard 160 to the toilet bowl 102. A person skilled in the art will understand that various other mechanisms for retaining the removable toilet splash guard 160 to the toilet bowl 102 may be used instead of or in addition to the mechanism discussed above. For instance, in an embodiment, a plurality of removable fasteners may be used to secure the removable toilet splash guard 160 to the toilet bowl 102 (e.g., removable fastener 500 as shown in FIG. 5).

Figure 4A:
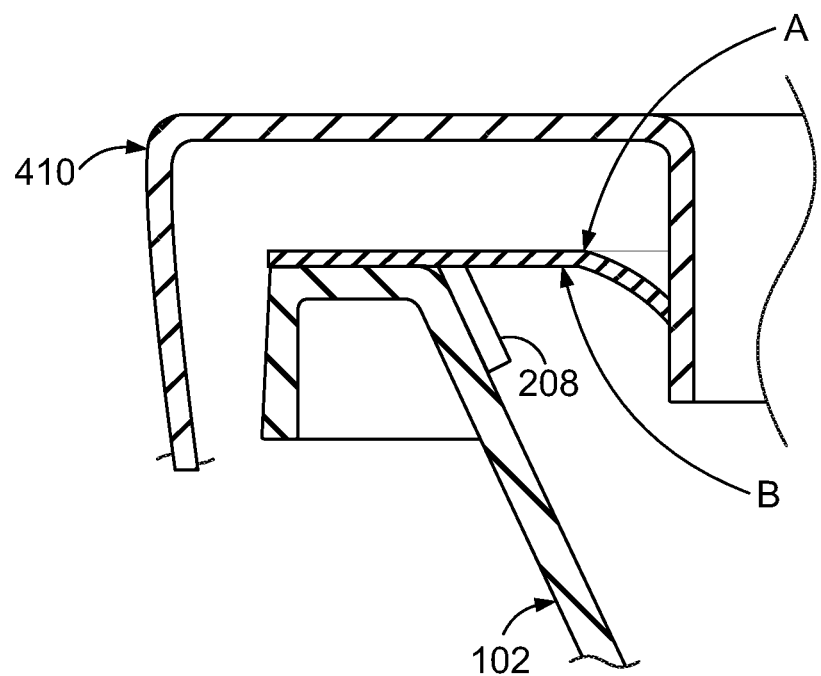
FIG. 4A is a cross-section view of airflow between the splashguard and toilet shroud during a resting state of the splashguard according to an embodiment.
Figure 4B:
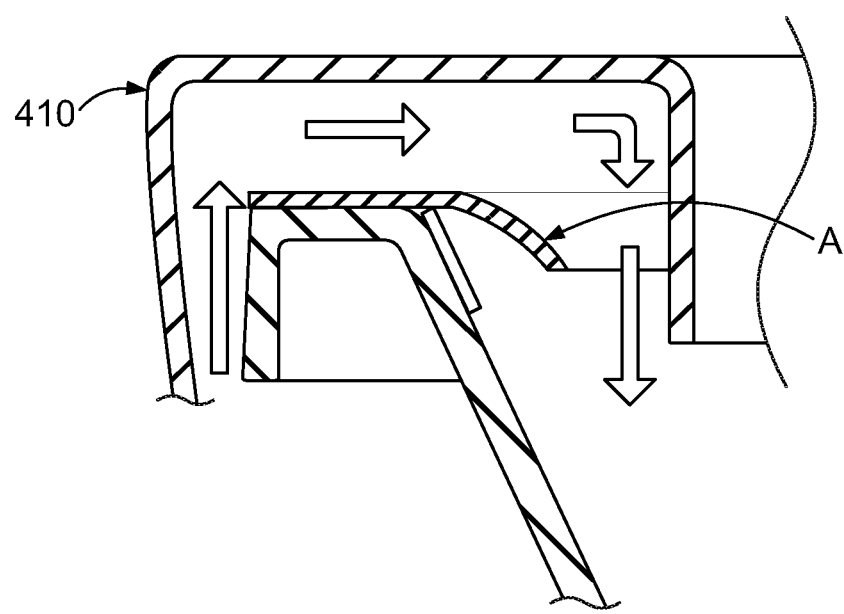
FIG. 4B is a cross-section view of airflow between the splashguard and toilet shroud during a flushing sequence according to an embodiment.

Turning now to FIG. 4A, the removable splash guard 160 is configured to be positioned between the toilet shroud 410 and the toilet bowl 102. In an embodiment, the lower portion B of the removable splash guard 160 is configured to substantially block waste disposed into the toilet bowl 102 from contacting the shroud 410, as shown in FIG. 4A.

In an embodiment, an air gap is present between the toilet shroud and the top of the vacuum toilet bowl to ensure that a negative pressure is not exerted on the passenger if they form a seal between their body and the toilet shroud in use. However, in conventional toilet systems, this air gap allows waste material to splash up under the shroud and over the bowl. If not properly or regularly cleaned, this build-up can produce a foul smell/odor behind the shroud.

According to an embodiment of the toilet system disclosed here, the removable splash guard 160 is configured to prevent both liquid and solid waste from splashing up under the toilet shroud 410, and over the top of the toilet bowl 102, while still providing adequate vacuum breaker (air gap) protection for the passenger.

More specifically, as illustrated in FIG. 4A, the removable toilet splash guard 160 is designed to prevent waste material from splashing under the toilet shroud 410 by closing the gap between the toilet bowl 102 and the toilet shroud 410. In an embodiment, the removable toilet splash guard 160 acts like a check valve and prevents waste from splashing up under the shroud 410 but allows air to enter the toilet if a seal has been formed between the occupant and the shroud 410. As can be seen more clearly in FIG. 4B, an airflow path (indicated by the arrows) connecting the outside and the inside of the toilet bowl 102 is created due to the flexibility of the removable toilet splash guard 160, during a flushing sequence.

Moreover, the toilet splash guard 160 can be easily washed with the current toilet cleaning brush to remove any waste which splashes up to the toilet splash guard 160. Over time, the toilet splash guard 160 may be replaced easily by replacing the removable plastic toilet bowl 102 or replacing the splash guard 160 directly. The splash guard 160 is designed for ease of assembly and removal to the top of the toilet bowl 102. According to an embodiment, the flexible planar shield of the splash guard 160 may be customizable to meet the particular shroud opening. This may be done with specific tooling or trim tooling at the time of manufacture, or by producing templates for trimming in the field.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

The particular implementations shown and described herein are illustrative examples and are not intended to otherwise limit the scope of the disclosure in any way. For the sake of brevity, conventional electronics, control systems, software development and other functional aspects of the systems (and components of the individual operating components of the systems) may not be described in detail.

The steps of all methods described herein are performable in any suitable order unless otherwise indicated herein or otherwise clearly contradicted by context. No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The invention claimed is:

1. A toilet bowl system, comprising:
a toilet bowl body comprising a toilet bowl and a shroud, the toilet bowl comprising a rim;
a removable splash guard positioned between the toilet bowl and the shroud, the removable splash guard comprising a shield having a central opening, a top portion, and a lower portion, the top portion faces the shroud and the lower portion faces the toilet bowl;
the lower portion includes:
a first ridge extending along an outside circumference of the shield;
a second ridge extending concentric to the first ridge, the shield forms an extension that projects inwardly from the second ridge as a continuation of the shield, the extension is configured to be in a first position in contact with the shroud to block waste disposed into the toilet bowl from contacting the shroud, and configured to be in a second position spaced from the shroud to maintain an airflow path from inside to the toilet bowl to outside the toilet bowl.

2. The system of claim 1, wherein the removable splash guard is secured to the rim of the toilet bowl by removable fasteners.

3. The system of claim 1, wherein a shape of the removable splash guard is customizable to correspond to an opening of the shroud.

4. The system of claim 1, wherein the first ridge and the second ridge are axially spaced apart from each other.

5. The system of claim 1, wherein the shroud is positioned relative to the toilet bowl to define an air gap between the shroud and the toilet bowl.

6. The system of claim 1, wherein the removable splash guard is configured to provide an airflow path connecting an inside and an outside of the toilet bowl during a flushing sequence.

7. The system of claim 1, wherein the second ridge extends perpendicular to the shield.

8. The system of claim 1, wherein the shield is flexible.

9. The system of claim 1, wherein the rim of the toilet bowl is configured to fit in a space between the first ridge and the second ridge.

10. The system of claim 9, wherein:
the first ridge includes a free end; and
a lip extends from the free end of the first ridge and towards the central opening of the shield.

11. The system of claim 10, wherein:
the lip of the first ridge is configured to overlap a portion of the rim of toilet bowl to secure the removable toilet splash guard to the toilet bowl.

12. A removable toilet splash guard, comprising:
a shield having a central opening, a top portion, and a lower portion, the top portion faces a shroud and the lower portion faces a toilet bowl;
the lower portion includes:
a first ridge extending along an outside circumference of the shield;
a second ridge extending concentric to the first ridge, the shield forms an extension that projects inwardly from the second ridge as a continuation of the shield, the extension is configured to be in a first position in contact with the shroud to block waste disposed into the toilet bowl from contacting the shroud, and configured to be in a second position spaced from the shroud to maintain an airflow path from inside to the toilet bowl to outside the toilet bowl.

13. The removable toilet splash guard of claim 12, wherein:
the first ridge includes a free end; and
a lip extends from the free end of the first ridge and towards the central opening of the planar shield.

14. The removable toilet splash guard of claim 12, wherein the lip of the first ridge is configured to overlap a portion of the rim of toilet bowl to secure the removable toilet splash guard to the toilet bowl.

15. The removable toilet splash guard of claim 12, wherein the first ridge and the second ridge are axially spaced apart from each other.

16. The removable toilet splash guard of claim 12, wherein the removable splash guard is configured to provide an airflow path connecting an inside and an outside of the toilet bowl during a flushing sequence.

17. The removable toilet splash guard of claim 12, wherein the second ridge extends perpendicular to the shield.

18. The removable toilet splash guard of claim 12, wherein the shield is flexible.

19. The removable toilet splash guard of claim 12, wherein the central opening is inward from the first ridge and the second ridge.

20. The removable toilet splash guard of claim 12, wherein the first ridge extends perpendicular to the shield.

* * * * *